United States Patent [19]
Kuze

[11] Patent Number: 5,275,231
[45] Date of Patent: Jan. 4, 1994

[54] COOLING SYSTEM FOR AN AUTOMOTIVE ENGINE

[76] Inventor: Yoshikazu Kuze, 31-3, Higashimagome 1-chome, Ohta-ku, Tokyo, Japan

[21] Appl. No.: 989,524

[22] Filed: Dec. 11, 1992

[30] Foreign Application Priority Data

Jul. 28, 1992 [JP] Japan ................. 4-241125
Aug. 21, 1992 [JP] Japan ................. 4-264027

[51] Int. Cl.[5] .................................. F01P 7/16
[52] U.S. Cl. ........................ 165/35; 236/34.5; 123/41.1
[58] Field of Search ............ 165/35; 236/34.5; 123/41.1, 41.09, 41.08

[56] References Cited

U.S. PATENT DOCUMENTS

| | | | |
|---|---|---|---|
| 1,311,809 | 7/1919 | Giesler | 236/34.5 |
| 1,318,069 | 10/1919 | Giesler | 236/34.5 |
| 1,403,493 | 1/1922 | Farber | 236/34.5 |
| 2,422,924 | 6/1947 | Puster | 236/34.5 |
| 3,510,060 | 5/1970 | Starmühler | 236/34.5 |
| 3,743,452 | 7/1973 | Steinwart | 123/41.1 |
| 4,288,031 | 9/1981 | Hass | 236/34.5 |
| 4,560,104 | 12/1985 | Nagumo et al. | 236/34.5 |
| 4,606,302 | 8/1986 | Huemer et al. | 236/34.5 |
| 4,621,594 | 11/1986 | Kubis | 123/41.09 |
| 4,679,530 | 7/1987 | Kuze | 236/34.5 |

FOREIGN PATENT DOCUMENTS

| | | | |
|---|---|---|---|
| 0200011 | 11/1984 | Japan | 123/41.1 |
| 0201816 | 9/1986 | Japan | 123/41.08 |
| 0023311 | 1/1991 | Japan | 123/41.1 |
| 0396031 | 12/1973 | U.S.S.R. | 236/34.5 |

Primary Examiner—John K. Ford
Attorney, Agent, or Firm—Beveridge, DeGrandi, Weilacher & Young

[57] ABSTRACT

A cooling system for an automotive engine has a first passage provided between an outlet of a water jacket of the engine and an inlet of a radiator, a second passage provided between an outlet of the radiator and an inlet of the water jacket, and a first bypass passage provided between the first passage and the second passage. A second bypass passage is provided between the second passage upstream of a thermostat and the first bypass passage, so that a part of the coolant flows in the cooling system passing through the radiator, the second bypass passage, and the first bypass passage when a bypass valve of the thermostat is opened.

5 Claims, 8 Drawing Sheets

COOLING SYSTEM FOR AN AUTOMOTIVE ENGINE

BACKGROUND OF THE INVENTION

The present invention relates to an automotive engine cooling system having a thermostat, and more particularly to a cooling system for controlling the circulation of coolant when the automotive engine is cold.

As shown in FIG. 7, a conventional cooling system for an automotive engine comprises a first coolant passage 6 disposed between an upper outlet 5 of water jackets 4 and an upper inlet 12 of a radiator 11, and a second coolant passage 14 provided between a lower outlet 13 of the radiator 11 and a lower inlet 10 of the water jackets 4, including a thermostat cap 16, a thermostat housing 8 and a water pump 9. A bypass passage 7 is provided between a junction J of the first passage 6 and the housing 8 so as to communicate the first passage 6 with the second passage 14 without passing the radiator 11. A thermostat 1 is secured to the housing 8 by the thermostat cap 16. The thermostat 1 has a main valve 3 and a bypass valve 2. In FIG. 7, the reference A' designates a measuring point for measuring the temperature of the coolant in the housing 8, and B' designates a measuring point provided in the second passage 14 adjacent to the cap 16 and upstream of the thermostat 1 for measuring the temperature of the coolant in the second passage 14. C designates a measuring point for measuring the flow rate of the coolant in the second passage 14.

During the engine is warmed up, the main valve 3 of the thermostat 1 is closed, while the bypass valve 2 integrated with the main valve 3 is fully opened. Thus, the coolant drawn from the outlet 5 of the water jackets 4 does not pass through the radiator 11. The coolant is circulated by the water pump 9 through the junction J of the first passage 6, bypass passage 7, housing 8, and inlet 10 of the water jackets 4 as indicated by arrows. Thus, the temperature of the coolant in the housing 8 quickly rises.

However, since the coolant in the radiator 11 and the thermostat cap 16 is not circulated, the temperature rising rate of the coolant therein is slow. Therefore, as shown in a record of FIG. 8, even if temperature A at the point A' becomes 85° C. which is an opening temperature of the main valve 3, temperature B at the point B' is 56° C. There is a difference of 29° C. between the temperatures A and B.

When the main valve 3 of the thermostat 1 opens, the coolant of a low temperature is drawn from the lower outlet 13 of the radiator 11 and fed to the thermostat housing 8 through the second passage 14. Consequently, the temperature B of the coolant at the point B' is further lowered by 20° C. As a result, the difference between the temperature B of the coolant in the passage 14 and the temperature A of the coolant in the housing 8 becomes 49° C.

Since the heat sensitivity of the thermostat 1 is low, the response of the thermostat delays with respect to the change of the coolant temperature. Therefore, the main valve 3 opens after the temperature has become higher than a predetermined opening temperature. Similarly, the main valve 3 closes after the coolant temperature has considerably decreased lower than a predetermined closing temperature. Namely, there is a large heat overshoot in control of the coolant temperature, which causes the main valve to be repeatedly opened and closed. When the main valve 3 closes, a surge pressure occurs at the upstream of the main valve. These variations of temperature and pressure are repeated, and gradually reduced, and faded away as the valve lift of the main valve 3 increases. Such a variation of the temperature is definitely shown in FIG. 8.

Such a heat overshoot causes cracks of the cylinder block and cylinder head, and the surge pressure causes breakdown of the thermostat 1 and the radiator 11. The fluctuation of the hydraulic pressure causes overload on the water pump 9, which will shorten the life of the pump. Furthermore, an abnormally low temperature of the coolant at the opening of the main valve affects combustion condition in cylinders, which causes deteriorating the emission control and increasing fuel consumption of the engine.

These troubles are mainly caused by a large difference between the coolant temperatures A and B. Therefore, it is necessary to reduce the temperature difference for solving the problems.

SUMMARY OF THE INVENTION

An object of the present invention is to provide a cooling system for an automotive engine which may eliminate above described troubles at an early stage of the opening of the main valve of the thermostat.

In a cooling system of the present invention, a second coolant passage is connected to a first bypass passage by a second bypass passage, so that a part of coolant flows passing through a radiator and the second bypass passage, when a bypass valve in the first bypass passage is opened. Namely, a part of the coolant in a first coolant passage drawn from water jackets circulates through the first bypass passage as a first circulation, and the remainder of the coolant passes through the radiator, second coolant passage and second bypass passage as a second circulation. The coolant from the second bypass passage is mixed with the coolant in the first bypass passage.

These and other objects and features of the present invention will become more apparent from the following detailed description with reference to the accompanying drawings.

DETAILED DESCRIPTION OF THE PREFERRED EMBODIMENTS

Figure 1:
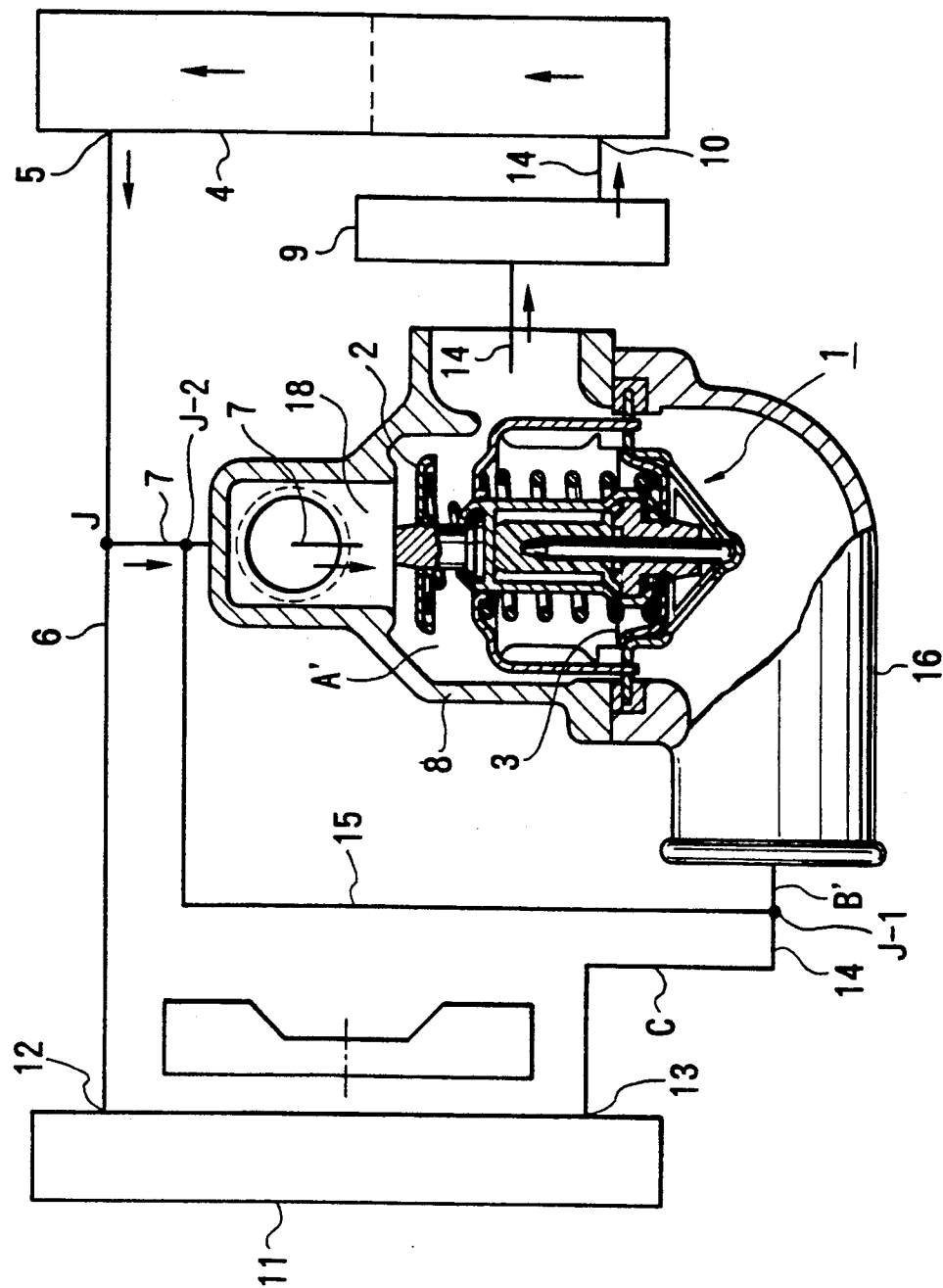
FIG. 1 is a schematic diagram showing a cooling system for an automotive engine according to the present invention.
Figure 7:
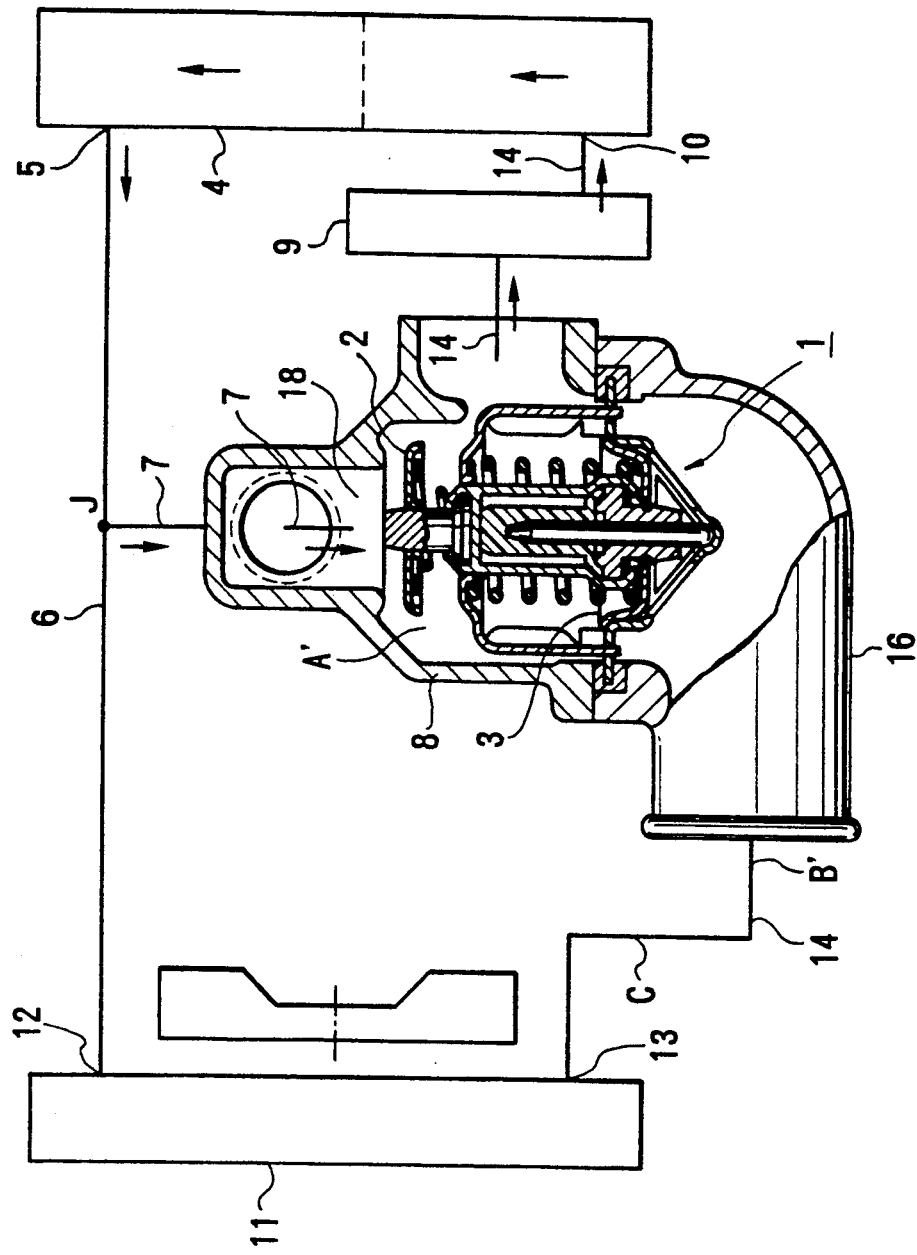
FIG. 7 is a schematic diagram of a conventional engine cooling system.

Referring to FIG. 1 showing a cooling system of the present invention parts of the system which are the same as the conventional cooing system of FIG. 7 are identified with the same reference numerals as FIG. 7.

A second bypass passage 15 is provided between a first junction J-1 of the second passage 14 upstream of the main valve 3 and a second junction J-2 of the first bypass passage 7. The second bypass passage 15 is connected to the second passage 14 at a position adjacent to the inlet of the thermostat cap 16. However, the second bypass passage 15 may be connected to any place of the second passage 14 between the main valve 3 and the outlet 13 of the radiator 11.

During the closing of the main valve 3, coolant having a high temperature drawn from the water jackets 4 is divided at the junction J of the first passage 6. A part of the coolant passes to the first bypass passage 7, and the remainder of the coolant is circulated passing through the radiator 11, second passage 14, second bypass passage 15, and first bypass passage 7. The coolant in the second bypass passage 15 is mixed with the coolant in the first bypass passage 7.

Figure 2:
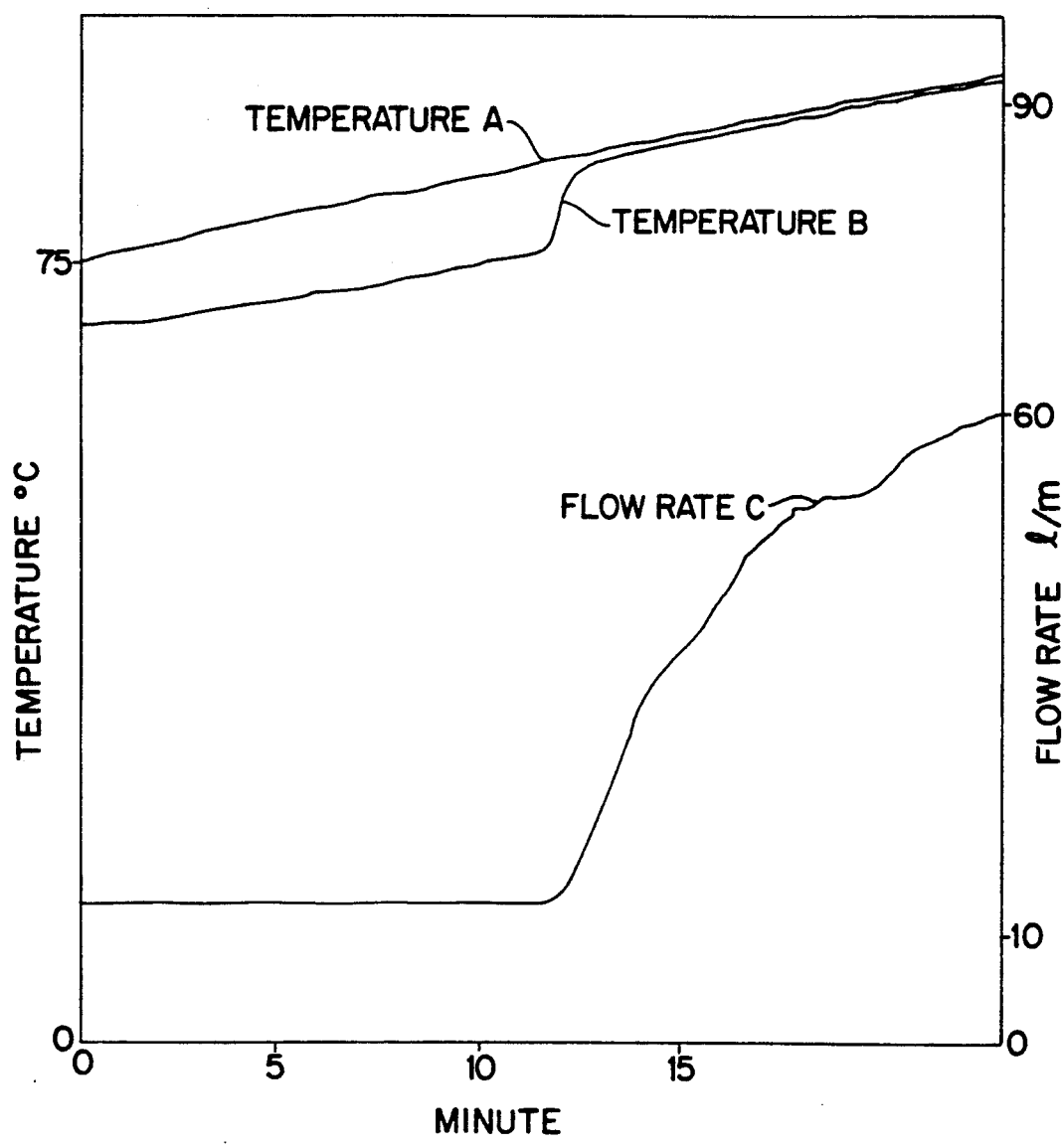
FIG. 2 shows a record of changes of temperature and flow rate of the coolant with respect to the time.

A pipe used for each of the first and second coolant passages 6 and 14 is of 24 mm diameter, and a pipe used for each of the first and second bypass passages 7 and 15 is of 10 mm diameter. During the closing of the main valve 3, the flow rate of the coolant at the point C passing through the radiator 11 is 13 liters per minute. As shown in FIG. 2, the difference between the temperatures A and B is 9° C.

When the temperature A of the coolant becomes 85° C., the main valve 3 of the thermostat 1 begins to open, and inversely the bypass valve 2 begins to close a bypass port 18 with a delay. When the bypass valve 2 completely closes the bypass port 18, the coolant flowing in the first and second bypass passages 7 and 15 is stopped at the same time. Thereafter, the coolant in the first passage 6 drawn from the outlet 5 of the water jackets 4 circulates by the water pump 9 passing through the radiator 11, second passage 14, thermostat cap 16, housing 8, and inlet 10 of the water jackets 4. Thus, the flow rate of coolant quickly increases up to 60 liters per minute.

As shown in FIG. 2, a starting point of the temperature A in the record is 75° C. The time until the bypass valve 2 completely closes the bypass port 18 shown in FIG. 2 is shorter by 2 minutes 12 seconds than that shown in FIG. 8.

In the first embodiment, although the thermostat housing 8 is disposed in the downward position, the housing may be disposed in the upward position or the lateral position. Since the coolant is forcibly circulated in the radiator, the same effect is obtained in any position.

Figure 3:
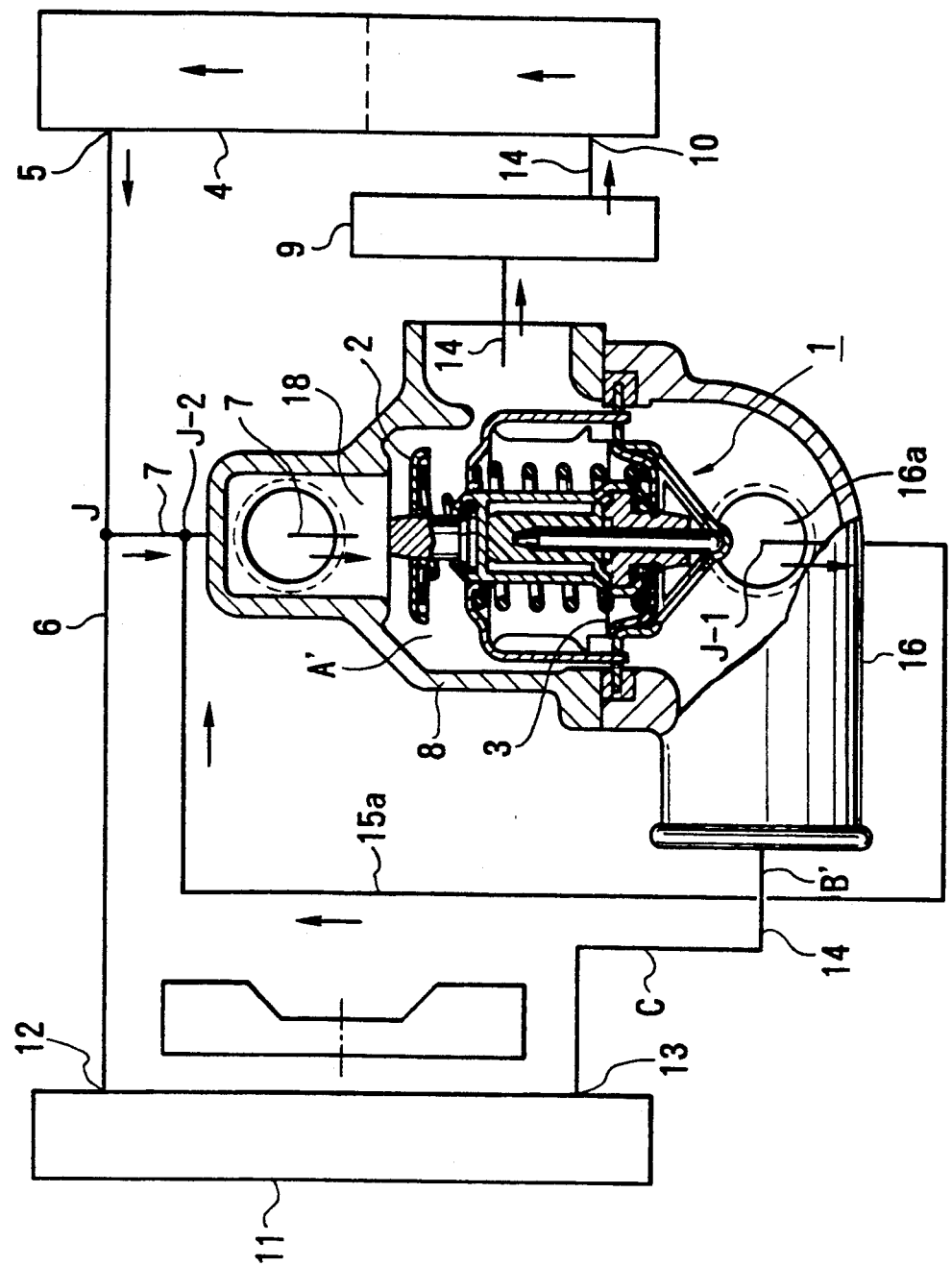
FIG. 3 is a schematic diagram of a second embodiment of the present invention.

FIG. 3 shows the second embodiment. The same parts as the first embodiment are identified with the same reference numerals as FIG. 1.

The first junction J-1 is formed on the thermostat cap 16 in the form of an opening 16a. A second bypass passage 15a is provided between the bypass opening 16a and the second junction J-2 of the first bypass passage 7.

Figure 4:
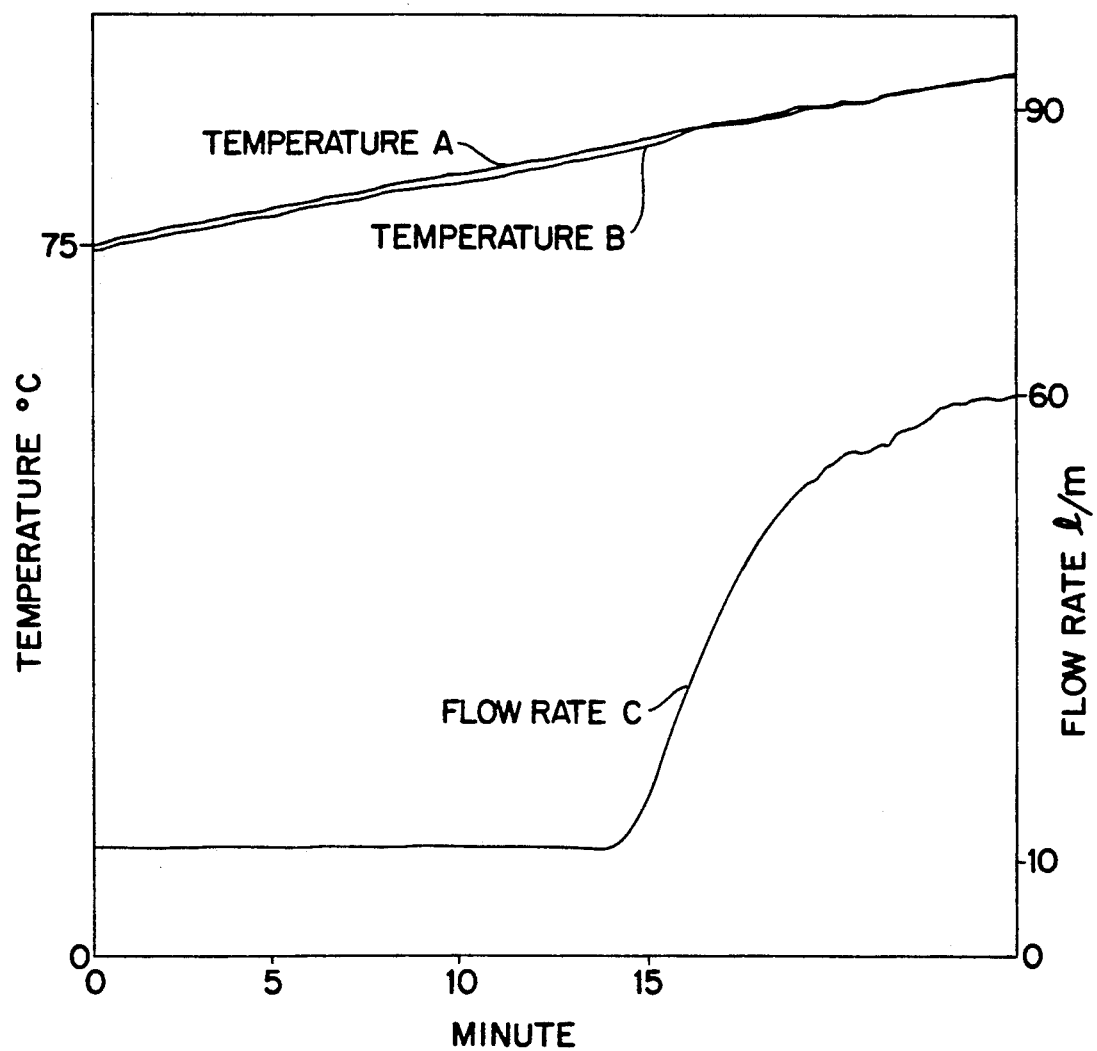
FIG. 4 shows a record of the second embodiment.

Similar to the first embodiment, each of the pipes of the coolant passages 6 and 14 is of 24 mm diameter, and each of the bypass passages 7 and T5a is of 10 mm diameter. As shown in FIG. 4, during the closing of the main valve 3, the difference between the temperatures A and B is 1° C.

In particular, the temperatures A and B increase at a constant rate from about 75° C. to a warmed up temperature without changing at the opening of the main valve. In other words, the time when the main valve opens is not indicated on the record. The fact that the temperatures A and B increase at a constant rate has a significant effect on the cooling system. Namely, there is no heat overshoot and pressure fluctuation. Thus, the devices of the system are prevented from suffering.

In the system, the flow rate of the coolant passing through the radiator 11 and the point C is 11.5 liters per minute until the bypass valve closes.

When the bypass valve 2 closes the bypass port 18, the coolant circulated passing through the first and second bypass passages 7 and 15a is stopped at the same time. Thereafter, the coolant in the first passage 6 circulates by the water pump 9 passing through the radiator 11, second passage 14, thermostat cap 16, housing 8, and inlet 10 of the water jackets 4. Thus, the flow rate of the coolant quickly increases up to 60 liters per minute.

Figure 8:
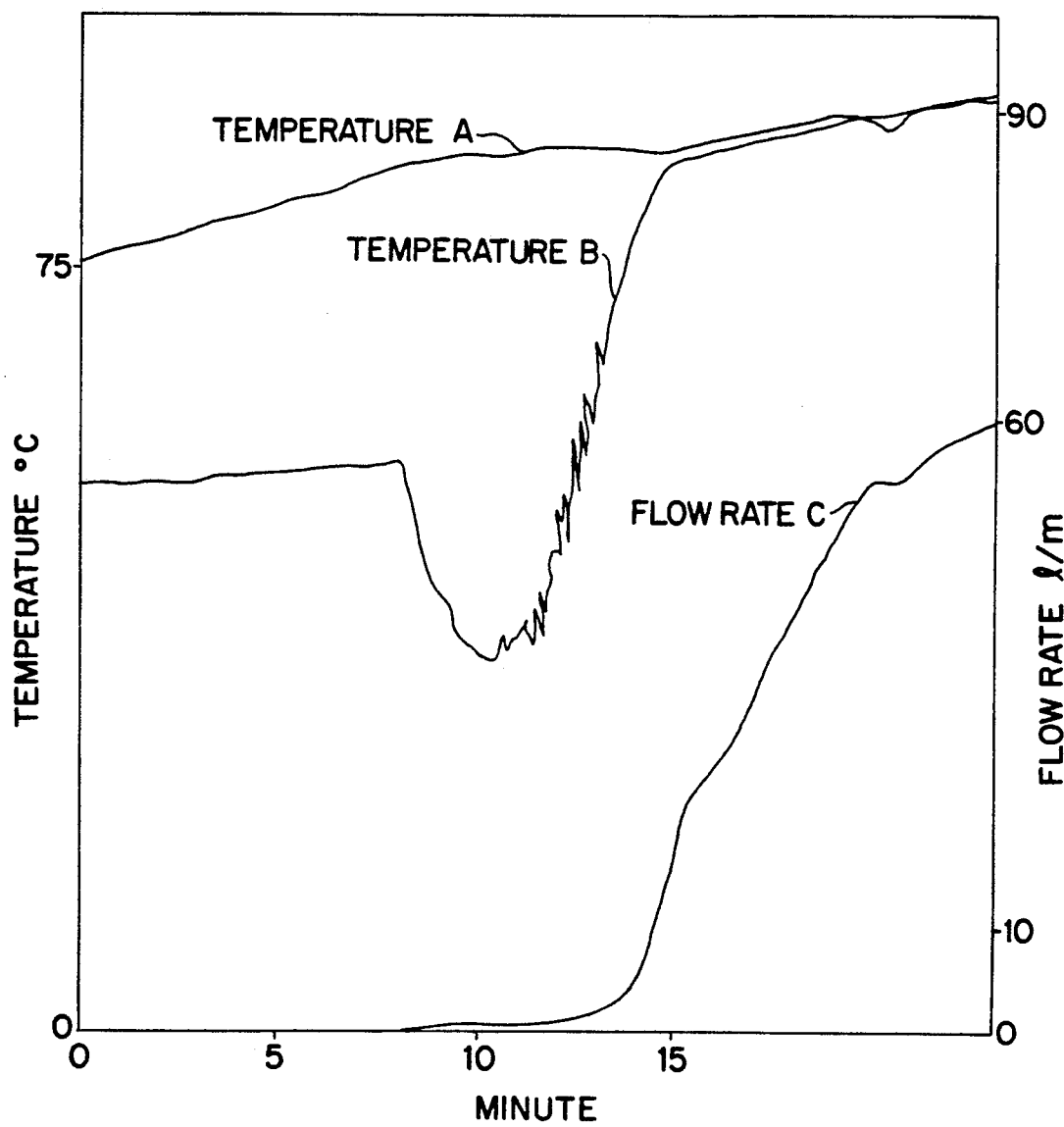
FIG. 8 shows a record of the conventional system.

The time until the bypass valve 2 closes the bypass port 18 shown in the record of FIG. 4 is approximately the same as that shown in the conventional record of FIG. 8.

The difference 1° C. between the temperatures A and B in the second embodiment can be easily reduced to zero.

Figure 5:
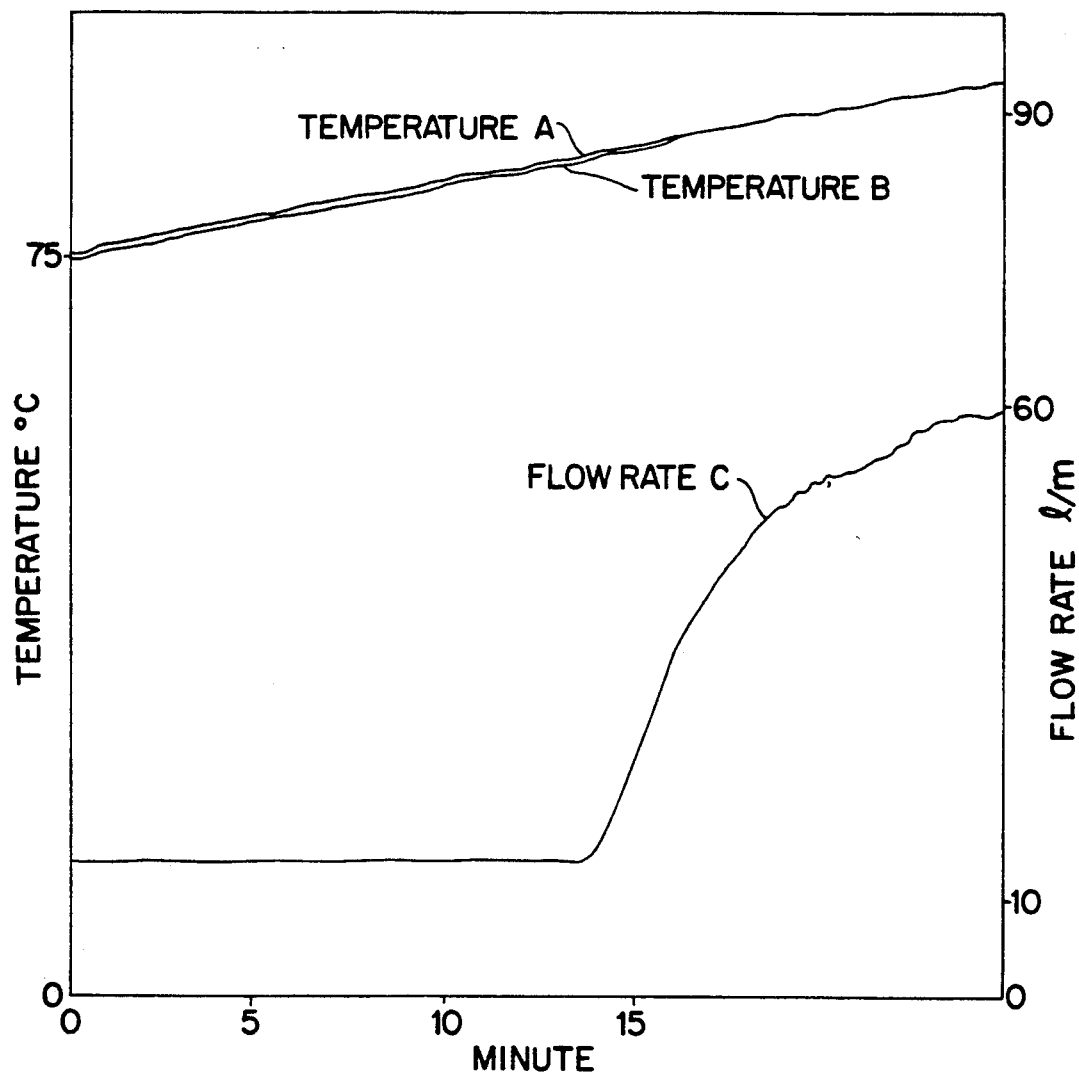
FIG. 5 shows a record of a modification of the second embodiment.

FIG. 5 shows a record of the modification of the second embodiment. If the diameter of the pipe used for the second bypass passage 15a is increased to 11 mm to reduce the fluid resistance, the difference between the temperatures A and B can be zero. However, in the record of FIG. 5, it seems that difference of 0.5° C. exists between the temperatures. The reason why the difference is written on the recording paper is as follows. A pen for the line A and a pen for the line B are disposed on a horizontal line, and the pen for the line B is located at a position where the pen records the line B prior to the pen for the line A by 3° C. Therefore, the actual value of a point on the line A is a value at a point where a horizontal line passing the point crosses the line B. Namely, the value of the line A is equal to that of the line B. In other words, the difference is zero.

Figure 6:
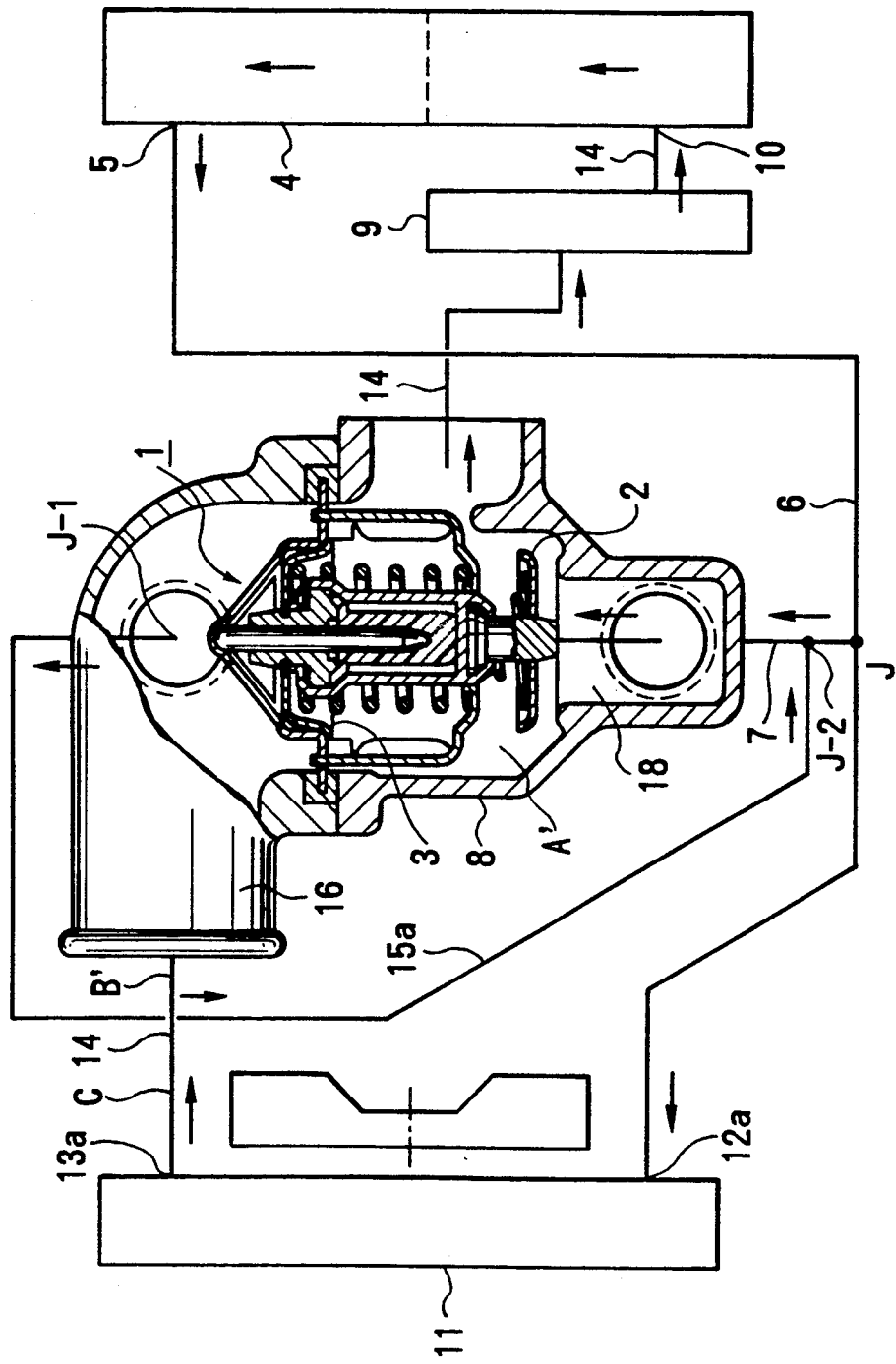
FIG. 6 shows a third embodiment of the present invention.

FIG. 6 shows the third embodiment of the present invention. In the cooling system of the third embodiment, the first passage 6 is provided to communicate the outlet 5 of the water jackets 4 with a lower inlet 12a of the radiator 11. The second passage 14 is provided to communicate an upper outlet 13a of the radiator 11 with the thermostat cap 16. Namely, the cooling system has an X-crossing passage arrangement. The second bypass passage 15a is provided between the thermostat cap 16 and the first bypass passage 7.

In the cooling system, although the coolant does not flow in the radiator 11 during the warming up of the engine, the high temperature coolant in the water jackets 4 is directly introduced in the lower inlet 12a. Therefore, the heat of the coolant in the first passage 6 is transmitted to the coolant in the radiator 11 by the conduction and convection. Thus, the thermal efficiency is more improved than the foregoing embodiments.

In accordance with the present invention, during the warming up of the engine where the bypass value is opened, the difference between the temperatures (A and B) in the thermostat housing and the second coolant passage is very small. Thus, cracks of cylinder block and cylinder head are prevented, and the lives of the thermostat, radiator and water pump are extended. The cooling system of the present invention is effective to complete the combustion in the engine, thereby reducing emission and fuel consumption.

While the invention has been described in conjunction with preferred specific embodiments thereof, it will be understood that these descriptions are intended to illustrate and not limit the scope of the invention, which is defined by the following claims.

What is claimed is

1. A cooling system for an automotive engine having a water jacket, having a radiator, a first passage provided between an outlet of the water jacket and an inlet of the radiator, a second passage provided between an outlet of the radiator and an inlet of the water jacket, a first bypass passage provided between the first passage and the second passage, a water pump provided in the second passage for circulating coolant in the system, a thermostat having a main valve provided in the second passage and a bypass valve provided in the first bypass passage, the improvement to the cooling system comprising:
a second bypass passage provided between a first junction provided on the second passage upstream of the thermostat and a second junction provided on the first bypass passage, whereby a part of the coolant flows in the cooling system passing through the radiator, the second bypass passage, and the first bypass passage when the bypass valve is opened.

2. The system according to claim 1 wherein the first passage is provided between the outlet provided at an upper portion of the water jacket and the inlet provided at an upper portion of the radiator, and the second passage is provided between the outlet provided at a lower portion of the radiator and the inlet provided at a lower portion of the water jacket, and the first junction is provided at a portion of the second passage upstream of a thermostat cap.

3. The system according to claim 1 wherein the first passage is provided between the outlet provided at an upper portion of the water jacket and the inlet provided at an upper portion of the radiator, and the second passage is provided between the outlet provided at a lower passage of the radiator and the inlet provided at a lower portion of the water jacket, and the first junction is provided on a thermostat cap.

4. The system according to claim 1 wherein the first passage is provided between the outlet provided at an upper portion of the water jacket and the inlet provided at a lower portion of the radiator, and the second passage is provided between the outlet provided at an upper portion of the radiator and the inlet provided at a lower portion of the water jacket, and the first junction is provided on a thermostat cap.

5. The system according to claim 1 wherein the thermostat has a thermostat cap provided upstream of the main valve.

* * * * *